(12) United States Patent
Gehrke et al.

(10) Patent No.: US 8,151,823 B2
(45) Date of Patent: Apr. 10, 2012

(54) FLUID POWER VALVE ARRANGEMENT WITH AT LEAST ONE SOLENOID VALVE

(75) Inventors: Martin Gehrke, Weinstadt (DE); Helmut Deichert, Waiblingen (DE)

(73) Assignee: Festo AG & Co. KG, Esslingen (DE)

( * ) Notice: Subject to any disclaimer, the term of this patent is extended or adjusted under 35 U.S.C. 154(b) by 870 days.

(21) Appl. No.: 12/283,337

(22) Filed: Sep. 11, 2008

(65) Prior Publication Data

US 2009/0107566 A1 Apr. 30, 2009

(30) Foreign Application Priority Data

Oct. 24, 2007 (EP) .................................... 07020744

(51) Int. Cl.
*F16K 31/06* (2006.01)
(52) U.S. Cl. ............. 137/554; 137/487.5; 137/559; 251/129.01; 251/129.04; 251/129.15; 340/538; 340/538.11; 340/870.18; 340/870.39
(58) Field of Classification Search ............. 251/129.01, 251/129.04, 129.15; 137/554, 559, 487.5; 340/538, 531, 12.32, 12.33; 335/79; 324/207.21; 307/1
See application file for complete search history.

(56) References Cited

U.S. PATENT DOCUMENTS

| | | | | |
|---|---|---|---|---|
| 4,390,863 A * | 6/1983 | Merkel | ..................... | 340/538.11 |
| 4,706,703 A * | 11/1987 | Takeuchi et al. | ........... | 137/487.5 |
| 5,539,188 A * | 7/1996 | Fallah et al. | ................... | 235/375 |
| 5,805,053 A * | 9/1998 | Patel et al. | ..................... | 375/257 |
| 6,140,940 A * | 10/2000 | Klofer et al. | ............. | 340/870.39 |
| 6,369,699 B1 * | 4/2002 | Liu | ........................... | 340/538.11 |
| 6,441,723 B1 * | 8/2002 | Mansfield et al. | ........ | 340/538.11 |
| 6,522,249 B1 * | 2/2003 | Lonigro et al. | ................ | 340/533 |
| 7,170,394 B2 * | 1/2007 | Chandler et al. | ........... | 340/12.32 |
| 7,315,234 B2 * | 1/2008 | Yanagida et al. | ........... | 340/12.36 |
| 7,327,221 B1 * | 2/2008 | Callaghan | .................. | 340/12.32 |
| 7,339,458 B2 * | 3/2008 | Cern | ........................... | 340/12.37 |
| 7,367,296 B2 * | 5/2008 | Degner et al. | .............. | 123/90.11 |
| 7,417,535 B2 * | 8/2008 | Mathews et al. | .............. | 340/533 |
| 7,537,172 B2 * | 5/2009 | Rossi et al. | ..................... | 236/51 |
| 7,907,050 B1 * | 3/2011 | Callaghan | ..................... | 340/538 |
| 7,986,219 B2 * | 7/2011 | Matsuoka | .................. | 340/12.32 |
| 2002/0088956 A1 * | 7/2002 | Ozawa et al. | ............ | 251/129.01 |
| 2005/0225434 A1 * | 10/2005 | Diorio et al. | .................. | 340/10.4 |
| 2007/0273205 A1 * | 11/2007 | Aoyama | ........................... | 307/3 |
| 2008/0009242 A1 * | 1/2008 | Rhodes et al. | .................. | 455/40 |
| 2008/0199001 A1 * | 8/2008 | Young | ....................... | 379/399.01 |
| 2008/0290986 A1 * | 11/2008 | Laughlin-Parker et al. | ... | 340/3.8 |

FOREIGN PATENT DOCUMENTS

| | | |
|---|---|---|
| EP | 1760642 | 3/2007 |
| GB | 2294531 | 5/1996 |
| JP | 2002-119726 | 4/2002 |
| WO | WO 03/017015 | 2/2003 |
| WO | WO 2005/015330 | 2/2005 |

* cited by examiner

*Primary Examiner* — Eric Keasel
*Assistant Examiner* — Minh Le
(74) *Attorney, Agent, or Firm* — Hoffmann & Baron, LLP

(57) ABSTRACT

A fluid power valve arrangement with at least one solenoid valve whose solenoid is connected or able to be connected via only two control lines with an electrical control and/or communication device. The solenoid valve has integrated in it a non-volatile storage device containing identification data of the solenoid valve, and furthermore a modulator for modulation of data of the solenoid valve in the two supply lines. The control and/or communication device possesses a demodulator for demodulation of the modulated data.

19 Claims, 1 Drawing Sheet

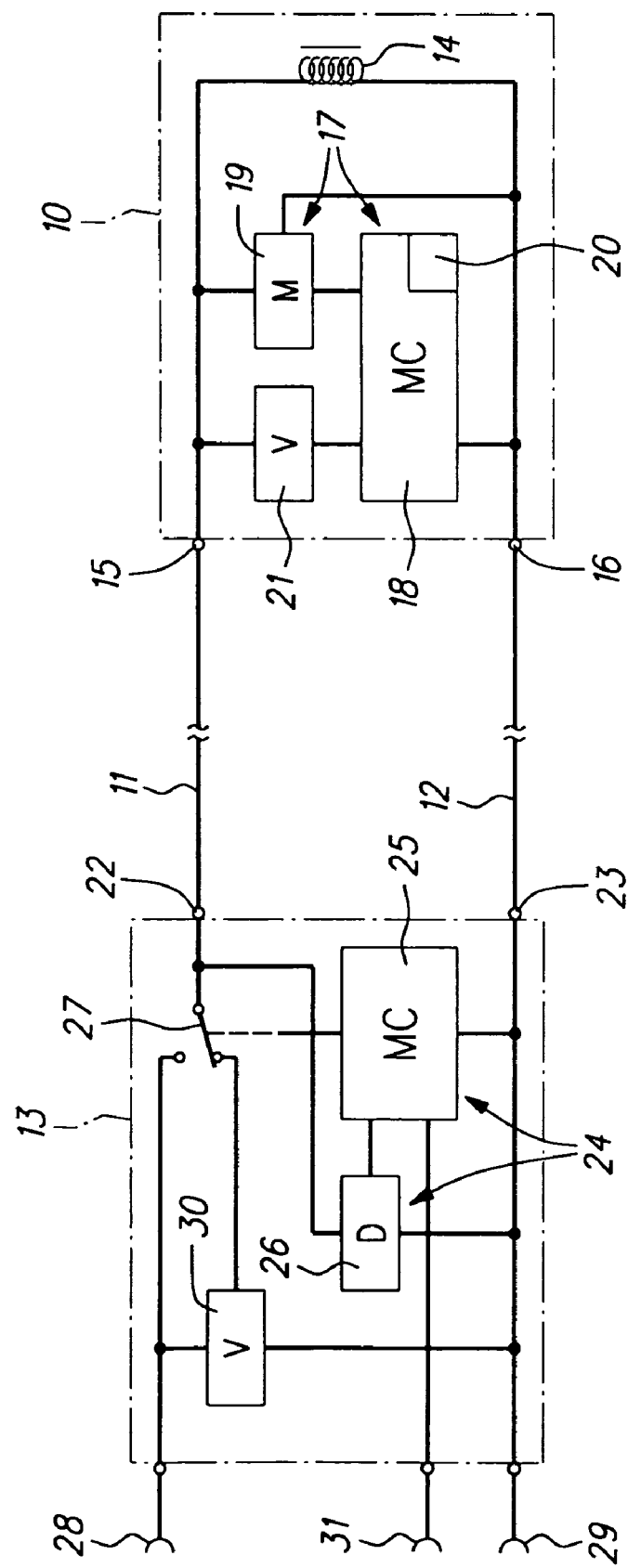

FLUID POWER VALVE ARRANGEMENT WITH AT LEAST ONE SOLENOID VALVE

BACKGROUND OF THE INVENTION

The invention relates to a fluid power valve arrangement with at least one solenoid valve, whose valve solenoid is connected or able to be connected by way of only two control lines with an electronic control and/or communication device.

For the identification of components in a plant, such as a fluid power plant, such components are frequently provided with a specification plate to identify them. This is important both for the selection of the components and also for replacement and for servicing and searching for defects. More particularly in the case of extremely large plant the reading of the specification plates is unjustifiably expensive and awkward.

The European patent publication EP 1 760 642 A2 discloses a valve recognition means, in the case of which the valves are provided with transponders, which contain identification data for the respective valve able to be read by means of a reading device. For this purpose the valve must be however fitted with programmed transponders and a particular type of reading device is required.

The patent publication WO 03/017015 A1 discloses individual components of a gear unit with data memories for storage of identification data which may be transmitted in a wireless manner or via separate lines to a central unit. In this case as well additional components are again required for wireless communication or additional lines are necessary.

SUMMARY OF THE INVENTION

One aim of the present invention is to read out identification data of solenoid valves in a wired manner without additional lines being mandatory.

This object is to be attained in accordance with the invention by a fluid power valve arrangement with the features of claim 1.

The design in accordance with the invention more especially offers the advantage that the two control lines, present in any case for actuation of the solenoid valve of the valve arrangement are utilized additionally for the purpose of transmitting identification data from a storage means integrated in the solenoid valve to a control device or a communication device for the valve. Accordingly it is possible for example to use a solenoid valve provided with a modulator means to replace a conventional solenoid valve without additional lines having to be installed for data transmission.

The features recited in the dependent claims represent advantageous further developments and improvements in the valve arrangement as set forth in claim 1.

The modulator means preferably comprises a modulator connected with or integrated in a microcontroller, the storage means being more particularly connected with the microcontroller or integrated in it. Accordingly there is a convenient and adjustable form of data storage and data transmission, additional or modified functions being readily and simply programmed.

In the solenoid valve there is advantageously an electrical power module, itself supplied by way of control lines, for the supply of electrical power to the modulator means, such module being more especially designed for producing a stabilized voltage. This power supply module may also be designed as an electrical energy storage means in order to allow data transmission even when the valve is turned off.

The storage means for the identification data may in addition be designed for storage of servicing data of the solenoid valve, more particularly numbers of switching cycles and/or information about the switched on time and the switching progression of the solenoid valve. The storage means is in this respect preferably in the form of an EEPROM.

The modulation and the demodulation during data transmission are preferably in principle on the basis of load modulation, amplitude modulation, phase modulation or frequency modulation.

The demodulator means as well is preferably in the form of a demodulator connected with a microcontroller or integrated in same.

More particularly when the solenoid valve or, respectively, the modulator means present in it is not provided with an energy storage means, a data transmission may take place even with the solenoid valve switched off, if a switch controlled by the microcontroller of the demodulator means is provided, in a first switching position supplies control signals for control of the valve solenoid to the control lines and in a second switching position supplies a voltage to the control lines but not yet actuating the valve solenoid. This voltage may then be utilized for operation of the modulator means and accordingly for data transmission.

The demodulator means, and in particular the microcontroller comprised therein, is preferably designed for converting and forwarding the demodulated signals as serial bus signals. Accordingly the information can be transmitted to a remote control center. This may in principle also take place in a wireless manner as well.

The modulator means and the demodulator means are best designed for unidirectional or bidirectional data transmission.

One embodiment of the invention is depicted in the drawing and will be explained in the following description in detail.

BRIEF DESCRIPTION OF THE DRAWING

FIG. 1 shows a block circuit diagram of a solenoid valve with an integrated modulator means connected via two line with a control and/or communication device, which contains a demodulator means.

DETAILED DESCRIPTION OF THE PREFERRED EMBODIMENTS

The working example depicted in FIG. 1 of a fluid power valve arrangement possesses a solenoid valve or electromagnetic valve 10, which is connected by way of two control lines 11 and 12 with a control and/or communication device 13.

The solenoid valve 10 possesses in a conventional manner a solenoid 14 for the actuation of a valve member, which is not illustrated for simplification of the drawing. The two control lines 11 and 12 are in joined to inputs 15 and 16, which for example may be in the form of input terminals, of the solenoid valve 10. A modulator means 17 integrated in the solenoid valve 10 consists of a modulator 19 joined with a microcontroller 18. The modulator 19 is connected with the two inputs 15 and 16 for the input of data. The microcontroller 18 includes an electronic memory 20 or storage device, which for example may be in the form of an EEPROM. This storage device 20 may naturally also be arranged separately from the microcontroller 18. For the power supply of the modulator means 17 a power supply module 21 is integrated in the solenoid valve 10. This power supply module 21 produces a regulated and preferably stabilized voltage.

The two control lines 11 and 12 are connected with outputs 22 and 23, which for example can be in the form of output terminals, with the control and/or communication device 13. The latter comprises a demodulator means 24, which consists of a demodulator 26 connected with a microcontroller 25. The demodulator 26 is for its part joined with the two outputs 22 and 23. The microcontroller 25 controls an electrical switch 27, which for example may also be in the form of an electronic switch. In a first switching setting (not illustrated) this switch connects a first power supply connection 28 with the one control line 11, whereas a second power supply connection 29 is constantly joined with the second control line 12. In this switching position, which is not illustrated, the solenoid valve 10 is actuated and the applied voltage supplies the power supply module 21 in the solenoid valve 10 and with the modulator means 17.

In the second switching position as illustrated of the switch 27 the first control line 11 is connected with a power supply means 30, whose voltage is so selected that the solenoid valve 10 does not respond yet but however there is a sufficient supply voltage for the power supply module 21 in the solenoid valve 10. The power supply means 30 itself is connected with the power supply terminals 28 and 29 for its own supply.

With the aid of the power supply means 30 the control and/or communication device 13, cooperating with the switch 27, it is possible to ensure that even when the solenoid valve 10 is turned off the power supply is provided for the modulator means 17. In an alternative design it is possible for the power supply means 30 to be omitted, the power supply module 21 then having an energy storage means or being able to be connected with one, for example in the form of a battery or a capacitor. The latter is then charged in each case on operation of the solenoid valve 10 and, when the solenoid valve 10 is turned off, provides the power supply for the modulator means 17.

The two supply power connections 28 and 29 may be joined with a remote control means or control center. It is however also possible for the microcontroller 25 to partially or completely implement control functions for the solenoid valve 10. It is able to be connected by way of an external control device or control center, data exchange then being able to take place by way of serial signals. The microcontroller 25 is in this case connected with a field bus node or, respectively, a field bus station or as such may contain one.

In the electronic storage means 20 of the solenoid valve 10 identification data of the solenoid valve 10 are stored, as for example details of the manufacturer, details of the type, the date of production, the serial number or the like. Furthermore additional servicing or, respectively, diagnostic data can be stored, which are continuously required during operation of the solenoid valve, may be updated or, respectively, supplemented. In the case of such data it is a question for example of the number of switching cycles, information about the switched on time and the switching progression of the switching operations or the like. Such data may aid the operator of the plant as regards the replacement of worn parts by way of precaution.

These stored data are transferred on request or cyclically, for example every 1 to 2 seconds, in a modulated form to the control and/or communication device 13. For this purpose they are transmitted as load modulated, amplitude modulated, phase modulated or frequency modulated signals to the control lines 11 and 12 with a modulating effect. The modulation of alternating signals onto DC power signals is described for example in field bus technologies in accordance with IEC 61158-2. In this case the data are for example stored as a complete string including a check sum are stored in the storage means 20. Using a timer of the microcontroller 25 the carrier frequency is produced, for example 500 kHz and applied to the outputs 22 and 23. The content of the storage means is charged into a shift register and serialized. Dependent on the desired protocol this may take place with or without individual start and stop bits or, respectively, parity. The integrity of the data is ensured by a check sum even during production times, such sum being placed in the storage means 20. The binary data stream modulates the carrier frequency, the signals in the case of load modulation modulating the control signal of the solenoid valve 10 as a load modification.

In the demodulator 26 the modulated data signal is for example outcoupled using a capacitor (not illustrated) and amplified. Demodulation occurs for example via a diode and there is an adaptation to the signal level of conventional digital circuitry. The signals demodulated in this fashion are converted in the microcontroller 25 into serial output signals and supplied to the communication interface 31, which may represent a bus connection.

If the data are not to be cyclically transmitted, it is also possible for data requests to be transmitted to the solenoid valve 10 by the microcontroller 25 in the control and/or communication device 13 and the transmission of the data then occurs only after such a request. In this case both the modulator 19 in the solenoid valve 10 and also the demodulator 26 in the control and/or communication device 13 may be designed in the form of a combined modulator/demodulator.

In the working example as illustrated and described the valve arrangement comprises only one solenoid valve. It would however naturally be possible for the control and/or communication device to have several solenoid valves connected with it, as for example so-called valve clusters. In this respect in principle each of such solenoid valves may be provided with its own control and/or communication device.

What is claimed is:

1. A fluid power valve arrangement with at least one solenoid valve, whose solenoid is connected by way of only two power supply lines with an electronic control and/or communication device, wherein the solenoid valve has integrated in it a non-volatile storage means containing identification data of the solenoid valve, and furthermore a modulator means for modulation of data of the solenoid valve in the two power supply lines, the control and/or communication device having a demodulator means for demodulation of the modulated data, and the valve arrangement, further comprising a switch able to be controlled by a microcontroller of the demodulator means, such switch supplying in a first switching position control signals for the control of the solenoid to the power supply lines and in a second switching position supplies a voltage to the power supply lines not yet operating the solenoid.

2. The valve arrangement as set forth in claim 1, wherein the modulator means comprises a modulator connected with or integrated in a microcontroller.

3. The valve arrangement as set forth in claim 2, wherein the storage means is connected with or integrated in the microcontroller.

4. The valve arrangement as set forth in claim 3, wherein a power supply module, which is fed via the power supply lines, is integrated in the solenoid valve for power supply to the modulator means, such module being more especially designed for the production of a stabilized voltage.

5. The valve arrangement as set forth in claim 3, wherein the storage means is also adapted for the storage of servicing data of the solenoid valve.

6. The valve arrangement as set forth in claim 3, wherein the storage means is in the form of an EEPROM.

7. The valve arrangement as set forth in claim 2, wherein a power supply module, which is fed via the power supply lines, is integrated in the solenoid valve for power supply to the modulator means, such module being more especially designed for the production of a stabilized voltage.

8. The valve arrangement as set forth in claim 2, wherein the storage means is also adapted for the storage of servicing data of the solenoid valve.

9. The valve arrangement as set forth in claim 2, wherein the storage means is in the form of an EEPROM.

10. The valve arrangement as set forth in claim 1, wherein a power supply module, which is fed via the control lines, is integrated in the solenoid valve for power supply to the modulator means, such module being more especially designed for the production of a stabilized voltage.

11. The valve arrangement as set forth in claim 10, wherein the storage means is also adapted for the storage of servicing data of the solenoid valve.

12. The valve arrangement as set forth in claim 10, wherein the storage means is in the form of an EEPROM.

13. The valve arrangement as set forth in claim 1, wherein the storage means is also adapted for the storage of servicing data of the solenoid valve.

14. The valve arrangement as set forth in claim 1, wherein the storage means is in the form of an EEPROM.

15. The valve arrangement as set forth in claim 1, wherein the modulation and demodulation is on the basis of the principle of load modulation, amplitude modulation, phase modulation or frequency modulation.

16. The valve arrangement as set forth in claim 1, wherein the demodulation means comprises a demodulator connected with or integrated with a microcontroller.

17. The valve arrangement as set forth in claim 1, wherein the control and/or communication device comprises a power supply means for the supply of the voltage not yet operating the solenoid.

18. The valve arrangement as set forth in claim 1, wherein the demodulator means is designed for converting and passing on the demodulated signals as serial bus signals.

19. The valve arrangement as set forth in claim 1, wherein the modulator means and the demodulator means are designed for unidirectional or bidirectional data transmission.

* * * * *